Dec. 19, 1944. W. W. WERT 2,365,232
PORTABLE TOOL
Filed Sept. 5, 1942
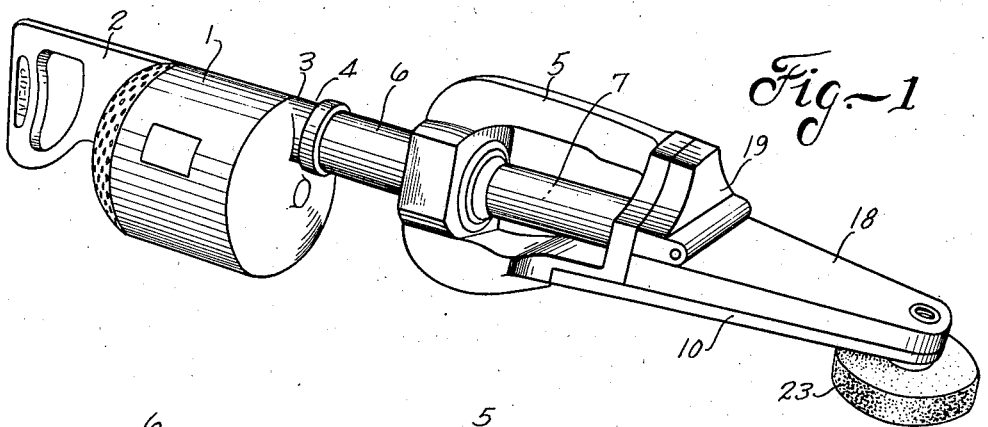
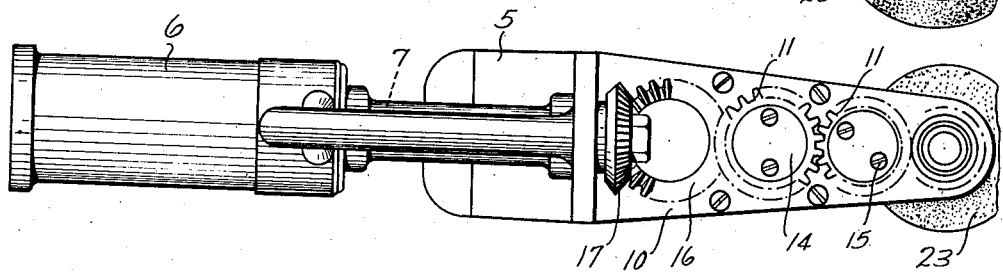
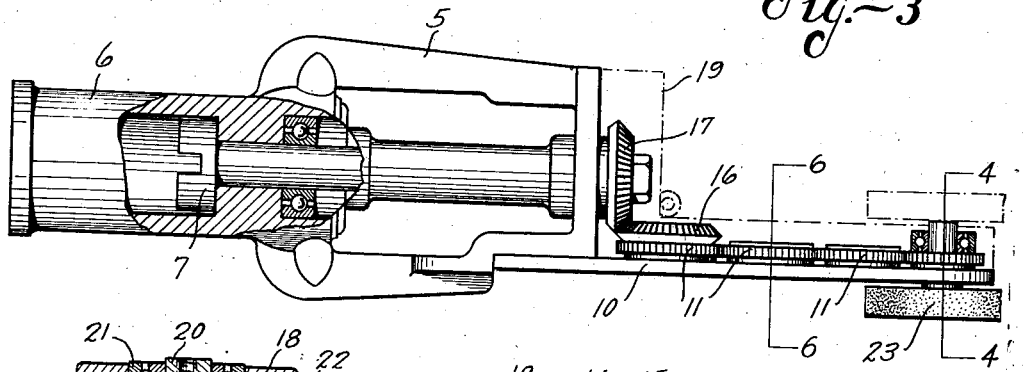
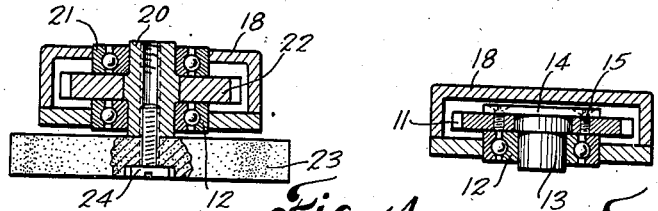
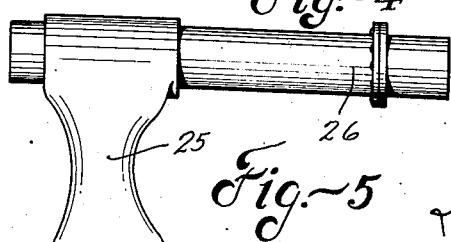
INVENTOR.
William W. Wert
BY
J. C. Walker
ATTORNEY.

Patented Dec. 19, 1944

2,365,232

UNITED STATES PATENT OFFICE 2,365,232

PORTABLE TOOL

William W. Wert, Dayton, Ohio

Application September 5, 1942, Serial No. 457,465

3 Claims. (Cl. 51—170)

This invention pertains to power operated hand tools, and more particularly to a disc grinder, circular saw, or analogous motor driven rotary cutting device for operation in restricted spaces.

In the present instance there is contemplated an extension attachment for an electric hand drill, comprising a rotary cutting disc mounted on an elongated supporting arm of small transverse dimensions for rotation in a plane parallel with the arm, of such compact construction as to enable it to be readily inserted in small openings, as, for example, for grinding key ways within a bore. Although adapted for use with an electric hand drill because of their convenience and availability, the present unit may be equally well employed in conjunction with an air motor or other driving unit, or may be attached to a handle grip for operation by a flexible shaft drive.

It is recognized that rotary cutting discs mounted for rotation in a plane parallel to a supporting arm have been heretofore employed. However, the assembly and mode of translating the driving motion from one direction to another has been such that the supporting arm was necessarily of enlarged size which restricted its field of operation. The present embodiment of such power operated rotary cutter is such that the size of the arm and associated parts may be greatly minimized.

The object of the invention is to improve the construction as well as the means and mode of operation of portable rotary grinders and analogous cutting tools, whereby they may not only be economically manufactured, but will be more efficient in use, capable of a wide field of operation, uniform in action, having relatively few operating parts, and be unlikely to get out of repair.

A further object of the invention is to provide a convenient attachment for an electric hand drill or similar power unit, by which a cutter disc mounted for operation in a fore and aft plane may be driven in offset spaced relation with the power unit in its plane of rotation.

A further object of the invention is to provide a supporting arm and power transmission means of compact form for a rotary cutter disc, which will permit the insertion of the arm and disc within restricted spaces.

A further object of the invention is to provide an assembly of the character mentioned, wherein bulky and enlarged parts of the power transmission mechanism are spaced away from the cutter disc mount and in proximate relation with the power unit where they will not interfere with the use of the device within small openings.

A further object of the invention is to provide a remotely driven cutting disc optionally mountable on either side of an elongated supporting arm.

A further object of the invention is to provide a portable power cutting tool having the advantageous structural features and inherent meritorious characteristics, and mode of operation herein mentioned.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawing.

In the drawing, wherein is shown the preferred but obviously not necessarily the only form of embodiment of the invention, Fig. 1 is a perspective view of an assembled portable power driven rotary cutting tool embodying the present invention.

Fig. 2 is a side elevation, partly in section, of the cutter disc mounting arm and driving mechanism with the cover removed.

Fig. 3 is a longitudinal sectional view in a plane at right angle to that of Fig. 2.

Fig. 4 is a transverse sectional view on line 4—4 of Fig. 2.

Fig. 5 illustrates a handle grip for use with the present unit in lieu of the electric hand drill, when a flexible shaft or other driving means is employed as motive power.

Fig. 6 is a transverse sectional view on line 6—6 of Fig. 2.

Like parts are indicated by similar characters of reference throughout the several views.

While the present invention is herein shown and described as an attachment for a conventional portable electric hand drill, it is to be understood that it is readily adaptable to other driving units and the motive means may be made an integral part thereof. However, for economy and convenience an electric hand drill, which is readily available in most shops and manufacturing establishments, is the preferred power unit.

Referring to the drawing, 1 indicates a conventional electric hand drill, having the usual hand grip 2, the drive shaft 3 of which is disposed coincident with the longitudinal axis of the drill housing and projects therebeyond. Detachably mounted on the power shaft hub 4 of the electric drill housing is a frame 5 having a tubular neck 6 engageable with the housing hub 4. Journaled in suitable anti-friction bearings in the frame 5 is an extension shaft 7 detachably engageable in axial alignment with the drill motor power shaft 3 by interengaging clutch members 7' on the adjacent ends of the respective shafts. The frame neck 6 is interlocked with the drill shaft hub 4 by any suitable means.

The frame 5 includes a continuing elongated narrow arm 10 parallel with the axis of the power shaft 3, but laterally offset relative thereto. Mounted on the arm 10 is a series of intermeshing spur gear pinions 11. The arm 10 is provided at spaced intervals with a series of holes in which are pressed anti-friction bearings 12. The gear pinions are mounted on short peripherally shouldered studs 13 having large flat heads 14 fixed to the gear pinions by screws 15. The reduced ends of the pinion studs 13 are pressed within the bearings 12. The gear pinions intermesh with each other and rotate freely upon the bearings 12. The initial gear pinion of the series, i. e., that closest to the power unit, has attached thereto a bevel gear pinion 16, which intermeshes with a corresponding bevel gear pinion 17 on the end of the motor shaft extension 7.

A housing 18, removably engageable with the arm 10, encloses the series of intermeshing power transmitting gear pinions 11 and their mounts. An enlargement 19 of the housing 18 encloses the bevel drive pinion 17, by which the direction of rotation is translated from about an axis parallel with the supporting arm 10 to perpendicular thereto. The arm 10 may be extended to any desired length, and may be provided with any number of idler gear pinions. By reducing the diameters of the gear pinions, the width of the arm may be correspondingly reduced, and by increasing their number an arm of increased length may be employed. The provision of the cover 18—19 affords a hollow arm within which the power transmission and motion translating elements are enclosed.

At the extremity of the arm, there is provided a hollow driven shaft 20 mounted in spaced bearings 12 and 21 in the arm 10 and cover or housing 18 respectively. Intermediate the bearings 12 and 21 there is secured upon the hollow shaft 20 a driven gear pinion 22 which intermeshes with the final idler gear pinion 11 of the series and is rotated thereby. The shaft 20 is peripherally rabbeted or shouldered at opposite sides of the driven gear 22, and the reduced extremities are pressed within the inner or cone elements of the bearings 12 and 21 until arrested by the peripheral shoulders. The hollow shaft 20 terminates slightly beyond the bearings 12 and 21 and is screw threaded within its bore. A cutting disc 23, which may be an abrasive grinding wheel, a circular saw, or a fine mill cutter, is engageable with the shaft 20 optionally at either side of the arm 10 by means of a clamp screw 24 engageable in the screw threaded bore of the shaft 20 from either end thereof. The hub or center of the grinding disc or other rotary cutter 23 is preferably counter sunk to receive the head of the attachment screw 24.

The construction described is such that the size of the arm 10 is minimized and enables its introduction into restricted spaces. By enabling the cutting disc or grinding wheel, as the case may be, to be mounted on either side of the arm, the tool is readily adapted to operations and localities which could not otherwise be conveniently reached, and avoids the necessity of special left and right type tools. Whereas heretofore the gear or other driving connections for changing the direction of rotation of the driving and driven elements has been located in close proximity to the cutting member, which necessitates a bulky construction, the present power transmission mechanism enables the mounting arm to be maintained of small size and the drive mechanism of compact form by locating the motion translating members 16 and 17 in remote relation with the cutting disc and in proximate relation with the power unit.

In lieu of embodying the invention in an attachment for an electric hand drill as shown and described, the drive motor and cutter carrying arm with the power transmission mechanism may be permanently incorporated in a single unitary assembly. In Fig. 5 there is shown a handle unit 25 having a barrel or tube 26, on which the arm and power transmission mechanism may be mounted, as upon the motor housing hub 4, to accommodate a flexible drive shaft extended through the barrel or tube 26 from any suitable power unit to the shaft 7.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. In a portable power driven cutting tool, a driving motor, including a revoluble power shaft, a housing enclosing the motor beyond which the power shaft extends, an elongated hollow arm of relatively small cross sectional area projecting from the motor housing in parallel relation with the motor power shaft, a series of intermeshing idler spur gear pinions located within the hollow arm, a bevel gear pinion connected with the initial spur gear pinion of the series, a second bevel gear pinion on the motor power shaft in proximate relation with the motor housing intermeshing with the first mentioned bevel pinion to transmit motion progressively to each of the series of intermeshing spur gear pinions, a hollow shaft transversely disposed in the terminal end of said arm, spaced anti-friction bearings in the arm for said shaft, a driven spur gear pinion fast on said shaft intermediate the spaced bearings and intermeshing with the final idler gear pinion of the series, the bore of said hollow shaft being screw threaded, a rotary cutting disc interchangeably engageable with opposite ends of the shafts at opposite sides of the arm, and a screw stud removably engageable in the screw threaded bore of the hollow shaft from either end thereof for securing the rotary cutting disc thereto for unison rotation optionally on either side of the arm.

2. A portable power cutting tool, including a driving motor having a housing, an elongated flat relatively thin hollow arm projecting from the motor housing in a plane parallel with the axis of the motor, a perpendicular housing extension at one end of the arm, a transverse revoluble shaft mounted in the opposite extremity of the arm in spaced relation with the motor, a cutting disc optionally engageable with either end of the transverse revoluble shaft for unison rotation in a plane parallel with the axial plane of the motor, and driving means enclosed and concealed within the flat hollow arm for transmitting rotary motion from the rotor to the cutting disc, including a pair of intermeshing bevel pinions located within the perpendicular housing extension of said arm in proximate relation with the driving motor and in remotely spaced relation with the cutting disc shaft, the construction and arrangement being such as to permit the cross sectional area of the arm being minimized adjacent to the cutting disc.

3. An attachment for a conventional portable electric drill unit of the type wherein a motor enclosed within a housing drives a rotary power shaft, the end of which is accessible from the exterior of the housing, including a mounting frame detachably engageable with the electric drill unit, a rotary extension shaft journaled in the mounting frame and engageable end to end with the power shaft of the drill unit for unison rotation, an elongated flat arm projecting from the mounting frame in parallel relation with the axis of the extension shaft, a rotary cutting disc, a revoluble spindle journaled in said arm adjacent the extremity thereof with its axis at right angle to that of said extension shaft, the ends of the spindle being accessible from opposite sides of said arm, attachment means for interchangeably connecting the rotary cutting disc with the opposite ends of the spindle for unison rotation, the construction and arrangement being such that the rotary cutting disc is optionally mountable on either side of the extremity of the arm for rotation in a plane parallel with the arm and power transmission means, including motion translating means located in proximate relation with the mounting frame and in remotely spaced relation with the rotary cutting disc for translating the rotary motion of the shaft into rotary motion of the cutting disc about an axis at right angle to the axis of the shaft while maintaining the size of the arm at minimum cross sectional dimensions in proximity to the cutting disc.

WILLIAM W. WERT.